(12) United States Patent
Sullivan et al.

(10) Patent No.: US 7,676,694 B2
(45) Date of Patent: Mar. 9, 2010

(54) MANAGING SYSTEM COMPONENTS

(75) Inventors: Douglas Sullivan, Hopkinton, MA (US); Keith A. Morrissette, Whitinsville, MA (US); Steven D. Sardella, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 548 days.

(21) Appl. No.: 11/394,700

(22) Filed: Mar. 31, 2006

(65) Prior Publication Data

US 2007/0234130 A1    Oct. 4, 2007

(51) Int. Cl.
    *G06F 12/00* (2006.01)
(52) U.S. Cl. .............. 714/25; 714/44; 714/42; 714/48
(58) Field of Classification Search .......... 714/44, 714/40, 42, 43, 25, 26, 36, 8
    See application file for complete search history.

(56) References Cited

U.S. PATENT DOCUMENTS

| | | | | |
|---|---|---|---|---|
| 5,282,212 A | * | 1/1994 | Shah | 714/26 |
| 5,299,202 A | * | 3/1994 | Vaillancourt | 714/42 |
| 5,956,665 A | * | 9/1999 | Martinez et al. | 702/188 |
| 6,205,565 B1 | * | 3/2001 | Bissett et al. | 714/49 |
| 6,366,965 B1 | | 4/2002 | Binford | |
| 7,076,688 B2 | * | 7/2006 | Yamamoto | 714/6 |
| 7,234,023 B2 | * | 6/2007 | Abe et al. | 711/114 |
| 2004/0078634 A1 | * | 4/2004 | Gilstrap et al. | 714/5 |
| 2005/0010843 A1 | * | 1/2005 | Iwamitsu et al. | 714/724 |
| 2005/0120268 A1 | * | 6/2005 | Barr et al. | 714/25 |
| 2005/0223266 A1 | * | 10/2005 | Iwamitsu et al. | 714/5 |
| 2006/0212752 A1 | * | 9/2006 | Mechalke et al. | 714/7 |
| 2007/0168705 A1 | * | 7/2007 | Dohi | 714/6 |

FOREIGN PATENT DOCUMENTS

| | | |
|---|---|---|
| EP | 1 136 912 A2 | 9/2001 |
| GB | 2 398 405 A | 8/2004 |
| GB | 2398405 A * | 8/2004 |

OTHER PUBLICATIONS

Webopedia, "Northbridge", Nov. 4, 2002, http://www.webopedia.com/TERM/N/Northbridge.html.*
U.S. Appl. No. 11/394,699, filed Mar. 31, 2007.
International Serach Report.
Written Opinion of ISA.

* cited by examiner

*Primary Examiner*—Scott T Baderman
*Assistant Examiner*—Chae Ko (57) ABSTRACT

System components are managed. Based on a first communication path to a component, first identification information for the component is determined. Based on a second communication path to the component, second identification information for the component is determined. Based on the first identification information and the second identification information, an identity for the component is determined. Based on the identity, a set of tests is performed on the component. Based on the failure rate of the set of tests, it is concluded that another component on the first communication path is faulty.

20 Claims, 7 Drawing Sheets

| FAMILY ID (BYTES 1-2) | FIRST USED ON PROJECT | FRU-ID (BYTES 3-4) | FRU NAME |
|---|---|---|---|
| 00 00 | | undefined | |
| 00 01 | | 00 01 | |
| 00 01 | | 00 02 | |
| 00 01 | | 00 03 | |
| 00 01 | | 00 04 | |
| 00 01 | | 00 05 | |
| 00 01 | | 00 06 | |
| 00 01 | | 00 07 | |
| 00 01 | | 00 08 | |
| 00 01 | | 00 09 | |
| 00 01 | | 00 0A | |
| 00 01 | | 00 0B | |
| 00 01 | | 00 0C | |
| 00 02 | | 00 01 | |
| 00 02 | | 00 02 | |
| 00 02 | | 00 03 | |
| 00 02 | | 00 04 | |
| 00 02 | | 00 05 | |
| 00 02 | | 00 06 | |
| 00 02 | | 00 07 | |
| 00 02 | | 00 08 | |
| 00 02 | | 00 09 | |

MANAGING SYSTEM COMPONENTS

FIELD OF THE INVENTION

The present invention relates to managing system components.

BACKGROUND OF THE INVENTION

Today's networked computing environments are used in businesses for generating and storing large amounts of critical data. The systems used for moving, storing, and manipulating this critical data are expected to have high performance, high capacity, and high reliability, while being reasonably priced.

As is known in the art, large computer systems and data servers sometimes require large capacity data storage systems. One type of data storage system is a magnetic disk storage system. Here a bank of disk drives and the computer systems and data servers are coupled together through an interface. The interface includes storage processors that operate in such a way that they are transparent to the computer. That is, data is stored in, and retrieved from, the bank of disk drives in such a way that the computer system or data server merely thinks it is operating with one memory. One type of data storage system is a RAID data storage system. A RAID data storage system includes two or more disk drives in combination for fault tolerance and performance.

One conventional data storage system includes two storage processors for high availability. Each storage processor includes a respective send port and receive port for each disk drive. Accordingly, if one storage processor fails, the other storage processor has access to each disk drive and can attempt to continue operation.

Modern computer systems typically use a computer architecture that may be viewed as having three distinct subsystems which when combined, form what most think of when they hear the term computer. These subsystems are: 1) a processing complex; 2) an interface between the processing complex and I/O controllers or devices; and 3) the I/O (i.e., input/output) controllers or devices themselves. A processing complex may be as simple as a single microprocessor, such as a Pentium microprocessor, coupled to memory. Or, it might be as complex as two or more processors which share memory.

A blade server is essentially a processing complex, an interface, and I/O together on a relatively small printed circuit board that has a backplane connector. The blade is made to be inserted with other blades into a chassis that has a form factor similar to a rack server today. Many blades can be located in the same rack space previously required by just one or two rack servers. Blade servers typically provide all of the features of a pedestal or rack server, including a processing complex, an interface to I/O, and I/O. Further, the blade servers typically integrate all necessary I/O because they do not have an external bus which would allow them to add other I/O on to them. So, each blade typically includes such I/O as Ethernet (10/100, and/or 1 gig), and data storage control (SCSI, Fiber Channel, etc.).

The interface between the processing complex and I/O is commonly known as the Northbridge or memory control hub (MCH) chipset. On the "north" side of the chipset (i.e., between the processing complex and the chipset) is a bus referred to as the HOST bus. The HOST bus is usually a proprietary bus designed to interface to memory, to one or more microprocessors within the processing complex, and to the chipset. On the "south" side of the chipset are a number of buses which connect the chipset to I/O devices. Examples of such buses include: ISA, EISA, PCI, PCI-X, and Peripheral Component Interconnect (PCI) Express.

PCI Express is an I/O interconnect architecture that is intended to support a wide variety of computing and communications platforms and is described in the PCI Express Base Specification, Rev. 1.0a, Apr. 15, 2003 (hereinafter, "PCI Express Base Specification" or "PCI Express standard"). The PCI Express architecture describes a fabric topology in which the fabric is composed of point-to-point links that interconnect a set of devices. For example, a single fabric instance (referred to as a "hierarchy") can include a Root Complex (RC), multiple endpoints (or I/O devices) and a switch. The switch supports communications between the RC and endpoints, as well as peer-to-peer communications between endpoints.

The switch includes a number of ports, with at least one port being connected to the RC and at least one other port being coupled to an endpoint as provided in the PCI Express Base Specification. The RC, switch, and endpoints may be referred to as "PCI Express devices".

The switch may include ports connected to non-switch ports via corresponding PCI Express links, including a link that connects a switch port to a root complex port. The switch enables communications between the RC and endpoints, as well as peer-to-peer communications between endpoints. A switch port may be connected to another switch as well.

At least some of the end points may share an address domain, such as a memory address domain or an I/O address domain. The term "address domain" means the total range of addressable locations. If the shared address domain is a memory address domain, then data units are transmitted via memory mapped I/O to a destination address into the shared memory address domain. There may be more than two address domains, and more than one address domain may be shared. The address domains are contiguous ranges. Each address domains is defined by a master end point. Address portions associated with the individual end points may be non-contiguous and the term "portions" is meant to refer to contiguous and non-contiguous spaces. The master end point for a given address domain allocates address portions to the other end points which share that address domain. The end points communicate their address space needs to a master device, and the master device allocates address space accordingly.

Data units may be directed to one or more of the end points by addressing. That is, a destination address is associated with and may be included in the data units. The destination address determines which end point should receive a given data unit. Thus, data units addressed to the individual portion for a given end point should be received only by that end point. Depending on the embodiment, the destination address may be the same as the base address or may be within the address portion.

The end points may be associated with respective ports. Through this association, a given end point may send data units to and receive data units from its associated port. This association may be on a one-to-one basis. Because of these relationships, the ports also have associations with the address portions of the end points. Thus, the ports may be said to have address portions within the address domains.

A goal of PCI Express is to provide a migration strategy to expand from the legacy PCI technology into the new serial-based link technology. In at least some respects PCI Express aids this by being compatible to existing PCI hardware and software architectures. As a result, PCI Express also inherits a global memory address-based and tree topology architecture, which therefore is used in peer-to-peer communications between multiple hosts in various topologies, such as star, dual-star, and meshes, which are typically used in blade servers, clusters, storage arrays, and telecom routers and switches.

The PCI Express architecture is based upon a single host processor or root complex that controls the global memory address space of the entire system. Upon power-up and enumeration process, the root complex interrogates the entire system by traversing through the hierarchical tree-topology and locates all endpoint devices that are connection in the system. A space is allocated for each endpoint device in the global memory in order for the host processor to communicate with it.

In particular, a discovery and configuration cycle is begun in which each switch port and endpoint within the hierarchy is identified. The cycle comprises accessing configuration data stored in the each device coupled to the network switch fabric (e.g., the PCI configuration space of a PCI device). The switches comprise data related to devices that are coupled to the switch. If the configuration data regarding other devices stored by each switch is not complete, additional configuration cycles may be initiated until all devices coupled to the switches have been identified and the configuration data within each switch is complete.

During the aforementioned discovery and configuration operations, information is collected about each device installed in the system. Each PCI Express device stores information about its various device attributes, including capabilities and/or services supported by the device. The attribute information identifies functionality that may be accessed by the PCI Express device, such as mass storage or communication capabilities (via corresponding protocol interfaces), for example. The attributes parameter set (e.g., one or more attribute parameters in a list) is used, in part, to specify capabilities a requesting endpoint would like to access.

The attribute information may be stored in a table structure and may include a device ID, a vendor ID, a class code, a revision ID, a subsystem ID, a subsystem vendor ID, a capability pointer, and various reserved fields. The device ID comprises a 16-bit value assigned by the manufacturer of the device. The vendor ID is a 16-bit value assigned by PCI-SIG (Peripheral Component Interconnect Special Interest Group) for each vendor that manufacturers PCI Express-compliant devices. The class code is a 24-bit value that indicates the class of the device, as defined by PCI-SIG. The subsystem ID and subsystem vendor ID are analogous to the device ID and vendor ID, except they are applicable for devices that include PCI-compliant subsystems.

During link training, each PCI Express link is set up following a negotiation of link widths, frequency of operation and other parameters by the ports at each end of the link.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

The Fibre Channel protocol ("FCP") uses a single Open-Systems-Interface-like (OSI-like) stack architecture. Devices that are operable with the Fibre Channel protocol typically include a controller (an "FC controller") that embodies the functionality of some of the middle-layers of the FCP stack. Furthermore, FC controllers may involve a "controller chip". As part of the middle-layer FCP functionality, these FC controllers monitor the state of information transmissions over the FC communication links and are designed to take appropriate recovery measures should an unresponsive communication link be encountered.

A typical type of computer system test calls for the processor to execute firmware/software that operates at a lower level than an operating system based program, prior to booting the operating system. These include basic I/O system (BIOS) and power on self test (POST) programs. These types of tests provide relatively low-level control of component functionality and interconnect buses. BIOS and/or POST may use management signal connections (e.g., serial I2C (Inter-IC Bus) connections) to communicate with system components.

SUMMARY OF THE INVENTION

System components are managed. Based on a first communication path to a component, first identification information for the component is determined. Based on a second communication path to the component, second identification information for the component is determined. Based on the first identification information and the second identification information, an identity for the component is determined. Based on the identity, a set of tests is performed on the component. Based on the failure rate of the set of tests, it is concluded that another component on the first communication path is faulty.

One or more embodiments of the invention may provide one or more of the following advantages.

Component identification and fault diagnosis can be improved. Unnecessary field service can be avoided, saving cost. System monitoring and management can be simplified and streamlined.

Other advantages and features will become apparent from the following description, including the drawings, and from the claims.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION

In at least one implementation described in more detail below, a procedure uses identification information in embedded PROMs as a secondary way of identifying components possibly also identified under PCI Express. By this information the procedure achieves improved component failure identification and diagnostic information for effective execution of tests in the event of a failure.

Figure 1:
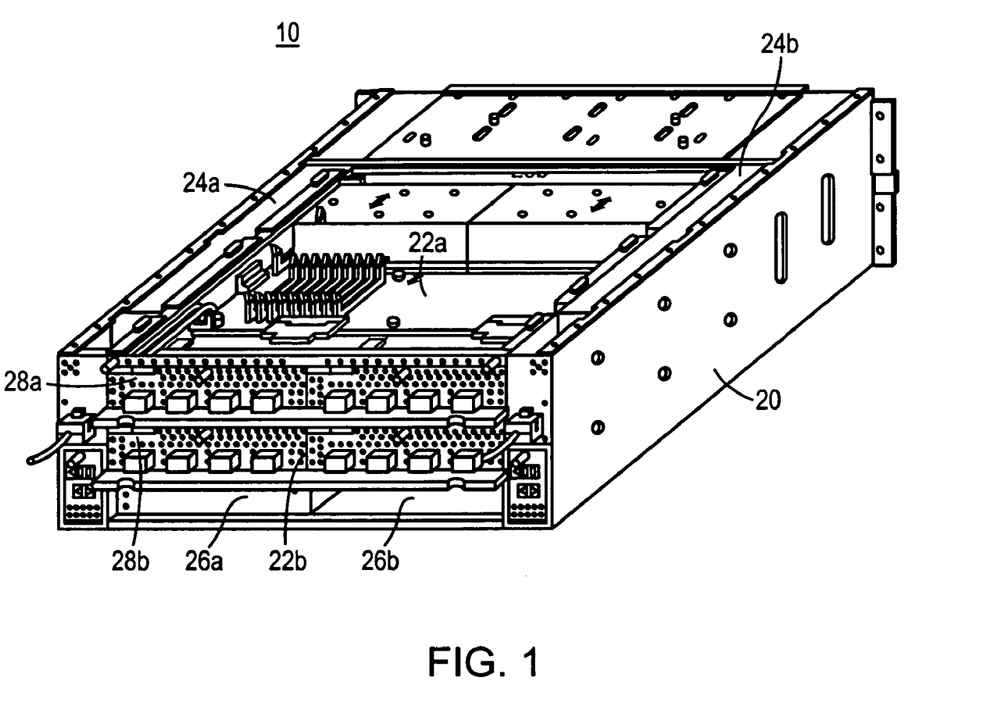
FIG. 1 is an isometric view of a storage system in which the invention may be implemented.

Referring to FIG. 1, there is shown a portion of a storage system 10 that is one of many types of systems in which the principles of the invention may be employed. The storage system 10 shown may operate stand-alone or may populate a rack including other similar systems. The storage system 10 may be one of several types of storage systems. For example, if the storage system 10 is part of a storage area network (SAN), it is coupled to disk drives via a storage channel connection such as Fibre Channel. If the storage system 10 is, rather, a network attached storage system (NAS), it is configured to serve file I/O over a network connection such as an Ethernet.

Figure 2:
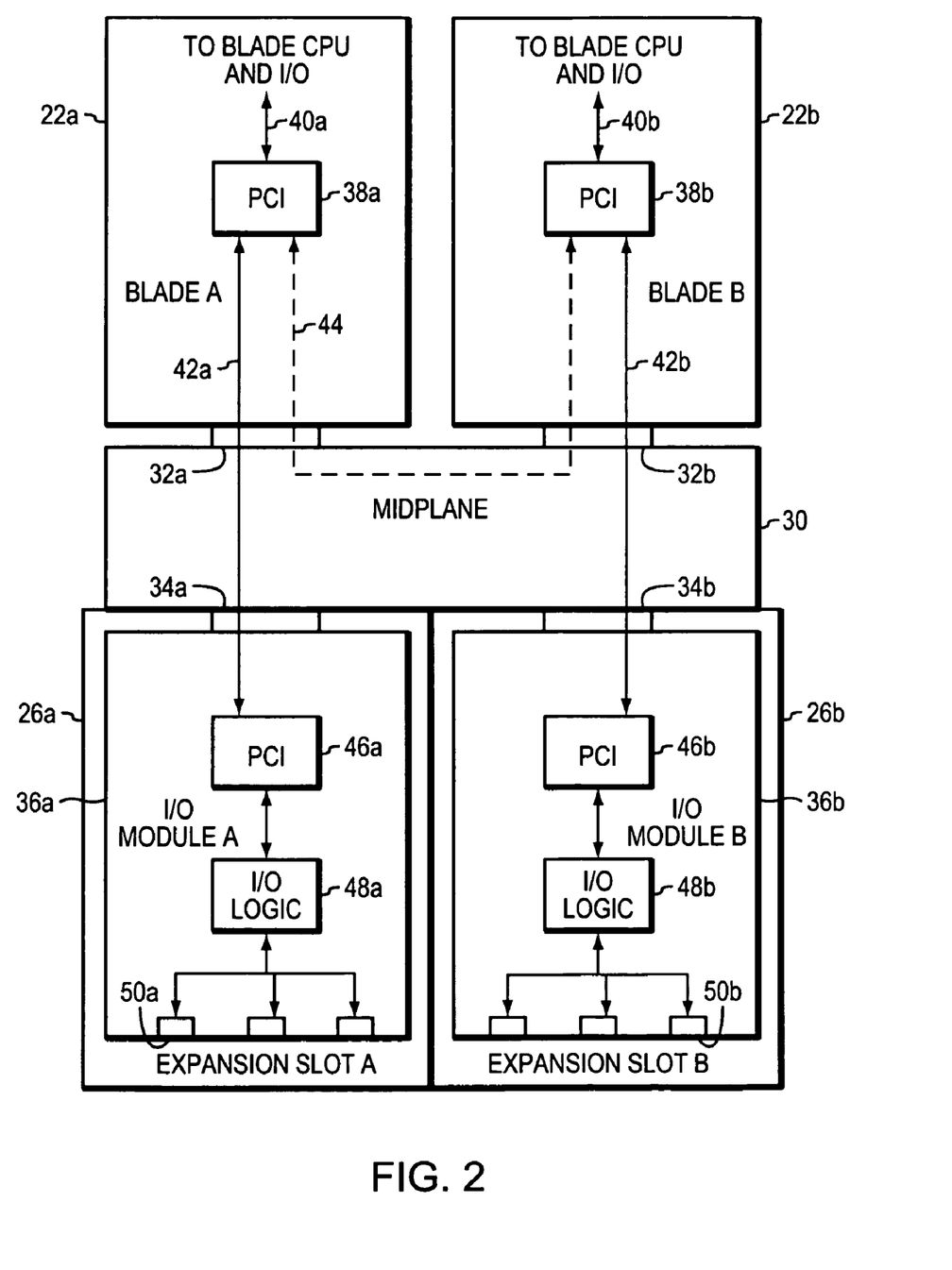
FIG. 2 is a schematic representation of a first configuration of the system of FIG. 1 showing a blades, two expansion slots, and two I/O modules installed in the expansion slots.

The storage system 10 includes within a chassis 20 a pair of blades 22a and 22b, dual power supplies 24a,b and dual expansion slots 26a,b. The blades 22a and 22b are positioned in slots 28a and 28b respectively. The blades 22a,b include CPUs, memory, controllers, I/O interfaces and other circuitry specific to the type of system implemented. The blades 22a and 22b are preferably redundant to provide fault tolerance and high availability. The dual expansion slots 26a,b are also shown positioned side by side and below the blades 22a and 22b respectively. The blades 22a,b and expansion slots 26a,b are coupled via a midplane 30 (FIG. 2). In accordance with the principles of the invention, the expansion slots 26a,b can be used in several ways depending on system requirements.

In FIG. 2, the interconnection between modules in the expansion slots 26a,b and the blades 22a,b is shown schematically in accordance with a first configuration. Each blade 22a,b is coupled to the midplane 30 via connectors 32a,b. The expansion slots 26a,b are also shown coupled to the midplane 30 via connectors 34a,b. The blades 22a,b can thus communicate with modules installed in the expansion slots 26a,b across the midplane 30. In this configuration, two I/O modules 36a and 36b are shown installed within the expansion slots 26a and 26b respectively and thus communicate with the blades 22a,b separately via the midplane 30.

In accordance with a preferred embodiment, the blades 22a,b and I/O modules 36a,b communicate via PCI Express buses—though it will be understood that PCI Express is only one example of many different types of busses that could be employed. (PCI Express is described in the PCI-SIG document "PCI Express Base Specification 1.0a" and accompanying documentation.) Each blade 22a,b includes a PCI Express switch 38a,b that drives a PCI Express bus 40a,b to and from blade CPU and I/O resources. The switches 38a,b (also known as "peer/annex bridges") split each PCI Express bus 40a,b into two PCI Express buses. One PCI Express bus 42a,b is coupled to the corresponding expansion slot 26a,b. The other PCI Express bus 44 is coupled to the other blade and is not used in this configuration—thus it is shown dotted. The I/O modules 36a,b are PCI Express cards, including PCI Express controllers 46a,b coupled to the respective bus 42a,b. Each I/O module 36a,b includes I/O logic 48a,b coupled to the PCI Express controller 46a,b for interfacing between the PCI Express bus 42a,b and various interfaces 50a,b such as one or more Fibre Channel ports, one or more Ethernet ports, etc. depending on design requirements. Furthermore, by employing a standard bus interface such as PCI Express, off-the-shelf PCI Express cards may be employed as needed to provide I/O functionality with fast time to market.

The configuration of FIG. 2 is particularly useful where the storage system 10 is used as a NAS. The NAS is I/O intensive; thus, the I/O cards provide the blades 22a,b with extra I/O capacity, for example in the form of gigabit Ethernet ports.

Figure 3:
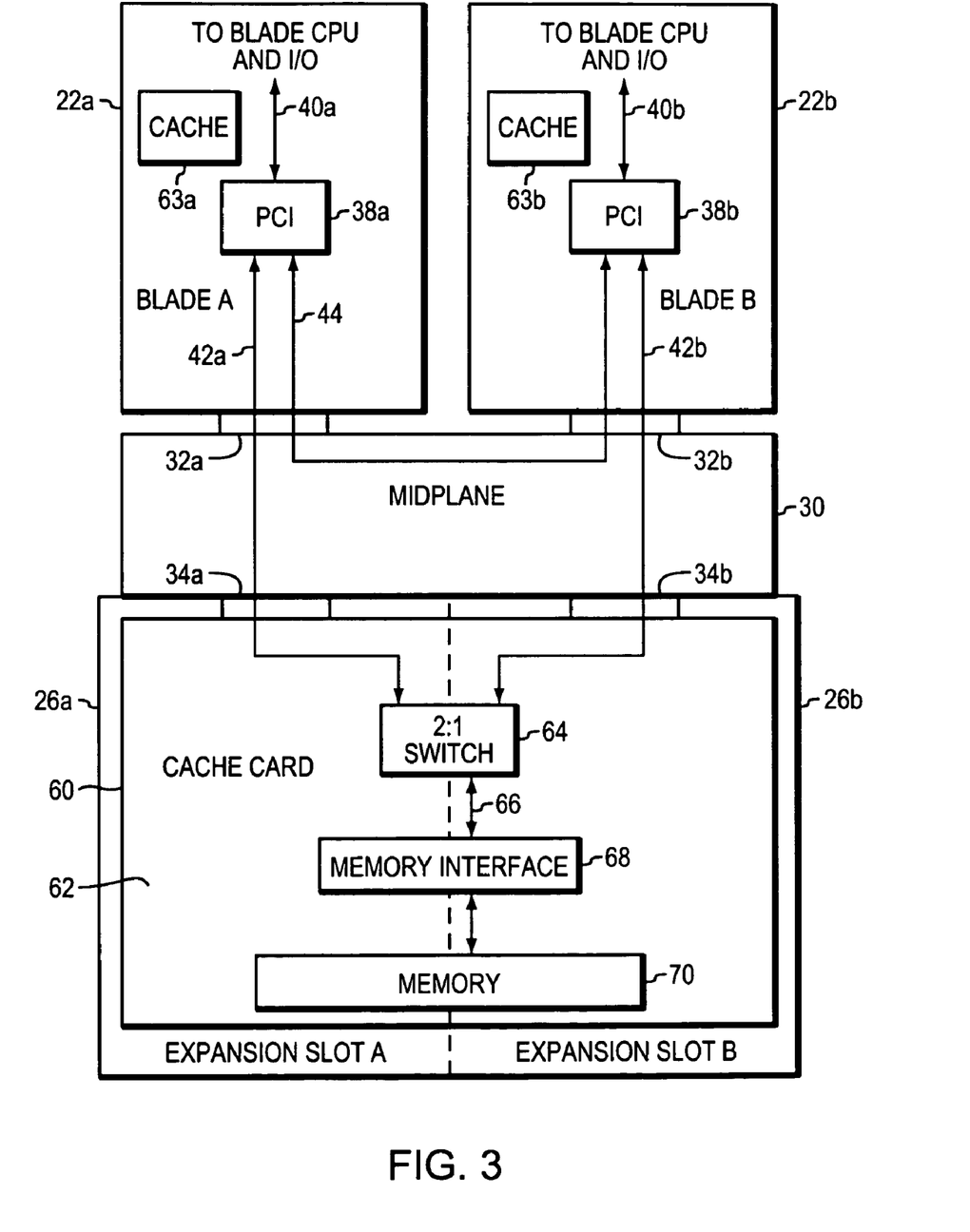
FIG. 3 is a schematic representation of a second configuration of the system of FIG. 1 showing the blades, two expansion slots, and one shared cache memory card installed in both the expansion slots.

Referring to FIG. 3, there is shown an alternate arrangement for use of the expansion slots 26a,b. In this arrangement, a single shared resource 60 is inserted in both the expansion slots 26a,b and is shared by the blades 22a,b. The shared resource 60 may be for example a cache card 62. The cache card 62 is particularly useful for purposes of high availability in a SAN arrangement. In a SAN arrangement using redundant blades 22a,b as shown, each blade includes cache memory 63a,b for caching writes to the disks. During normal operation, each blade's cache is mirrored in the other. The blades 22a,b mirror the data between the caches 63a,b by transferring it over the PCI Express bus 44. If one of the blades, for example blade 22a, fails, the mirrored cache 63a becomes unavailable to the other blade 22b. In this case, the surviving blade 22b can access the cache card 62 via the PCI Express bus 42b for caching writes, at least until the failed blade 22a recovers or is replaced.

As seen in FIG. 3, the cache card 62 includes a two-to-one PCI Express switch 64 coupled to the PCI Express buses 42a,b. The switch 64 gates either of the two buses to a single PCI Express bus 66 coupled to a memory interface 68. The memory interface 68 is coupled to the cache memory 70. Either blade 22a or 22b can thus communicate with the cache memory 70.

Referring to both FIGS. 2 and 3, it is noted that the PCI Express bus 44 is not used in the NAS arrangement but is used in the SAN arrangement. Were the PCI Express switches 38a,b not provided, the PCI Express bus 40a,b would be coupled directly to the PCI Express bus 44 for SAN functionality and thus would not be usable in the NAS arrangement. Through addition of the switches 38a,b, the PCI Express bus 40a,b is useful in the NAS arrangement when the PCI Express bus 44 is not in use, and is useful in the SAN arrangement during a blade failure. Note that the PCI Express bus 44 and the PCI Express buses 42a,b are not used at the same time, so full bus bandwidth is always maintained.

Figure 4:
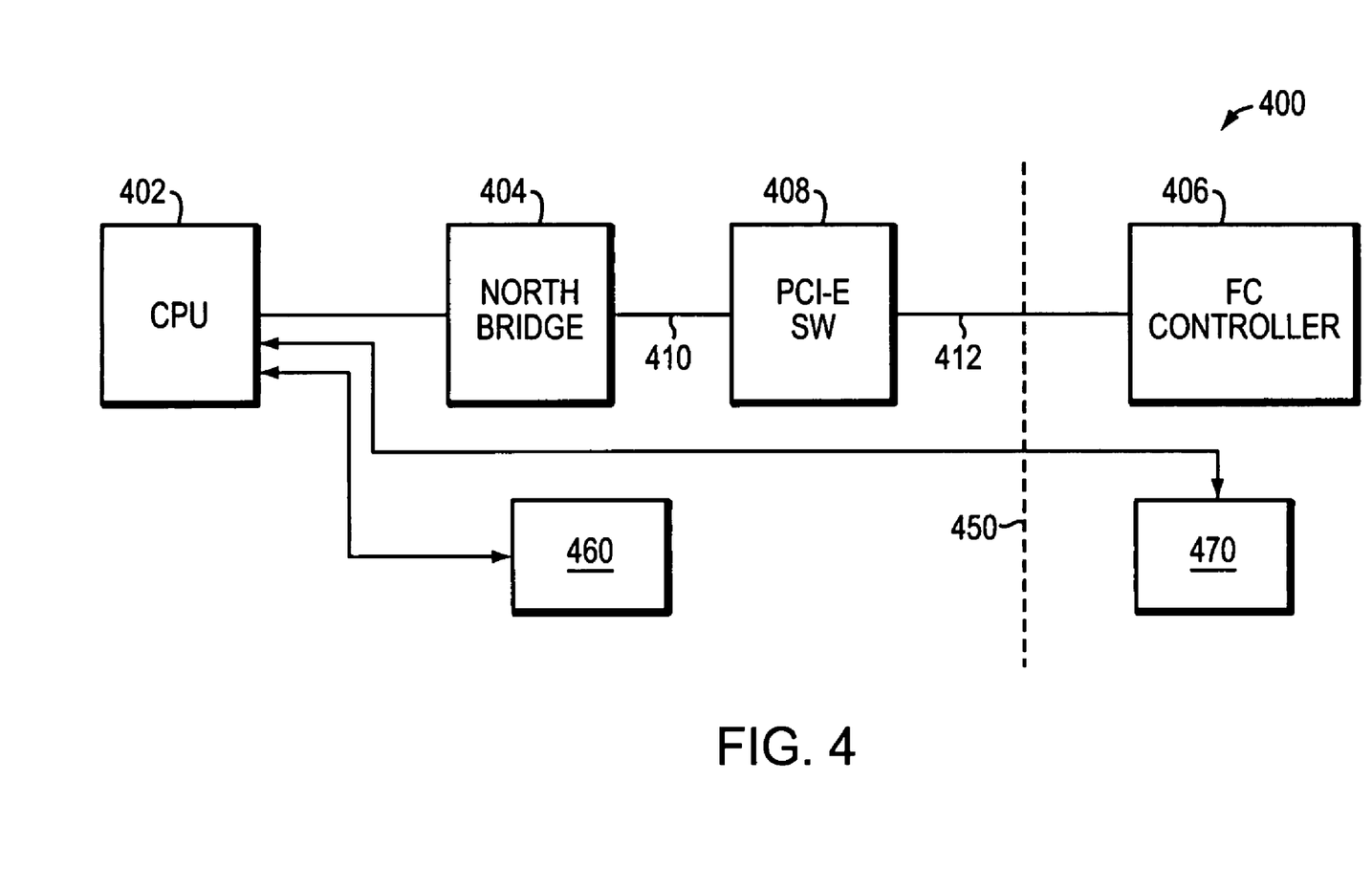
FIGS. 4, 6 are schematic representations of systems that may be used in or with the system of FIG. 1.

FIG. 4 illustrates a processing system 400 that may be used in or by system 10 above, and/or may be used in or by a different system. Northbridge 404 allows CPU 402 to communicate with Fibre Channel controller 406 via PCI Express switch 408 over PCI Express links 410, 412. CPU 402 may reside on blade 22a or 22b, switch 408 may serve as or be included in switch 38a or 38b above, controller 406 may serve as or be included in I/O logic 48a or 48b or PCI Express controller 46a or 46b above, and link 412 may use may use bus 42a or 42b above. Dashed line 450 indicates that system 400 is divided up into blade (CPU module) functionality and I/O module functionality.

The CPU module and the I/O module are in communication with one another for system management purposes. The modules may be interconnected in any of a number of ways in order to enable this communication. For example, an out-of-band communications bus, such as an I2C bus, may be provided for interconnecting the modules. The CPU module and the I/O module may have respective non-volatile memories herein referred to as Resume PROMs 460, 470. The basic functionality of the Resume PROM is described in co-pending U.S. patent application Ser. No. 10/330,806, filed Dec. 28, 2002, entitled "A Method and Apparatus for Preserving Data in a High Availability System", to Sardella et al. (hereinafter "806 application"), which is assigned to the same assignee as the present application, and which is incorporated in its entirety herein by reference.

As described in the 806 application, each Resume PROM has various fields that are useful for system management. As described below, each Resume PROM also has a field with a Family/FRU (field replaceable unit) identifier (FFID) that is used to help correctly identify a FRU (e.g., a CPU or I/O module) to improve field diagnostic efforts. Diagnosing, reporting, and isolating a fault are generally described in co-pending U.S. patent application Ser. No. 10/954,403, filed Sep. 30, 2004, entitled "Method and System for Detecting Hardware Faults in a Computer System", to EMC Corporation (hereinafter "fault detection patent application"), which is assigned to the same assignee as the present application, and which is incorporated in its entirety herein by reference.

In a system such as system 10 that may have one or more CPU modules and one or more I/O modules, POST may find a fault and then attempt to isolate the fault as being entirely on a CPU module or entirely on an I/O module, but may determine that the fault occurs on a boundary between the modules. In the latter case, POST cannot isolate to one module or the other, so both modules are determined to be faulty, but at least the fault is isolated to those two modules and not others in the system.

In at least some circumstances, it is difficult to communicate with components in the system due to a fault, or to determine which module a particular module is supposed to be, or to determine whether a module has failed in such a way that it appears to be a different module.

The Resume PROM, accessed over I2C for example, has clear contents describing what the module is supposed to be, but the fault might be that the Resume PROM cannot be accessed.

Through the PCI Express enumeration process, device registers may be read in an attempt to determine the components that are on a module and thereby determine that the module is a known type of module, but in some cases lane problems can lead to erroneous determinations.

The difference between a single failing device and a multiple failing device can lead to problems as well. For example, on a module, eight PCI Express lanes may be configured as two links of four lanes each, with the first link being to a first device and the second link being to a second device. In such a case, if the first link fails so that the first device cannot be discovered via the first link, it is useful to avoid confusing the failed module with a different type of module that lacks the first device, and to avoid confusing the remaining working four-lane link with an eight-lane link in which half of the lanes have failed.

In general, if only PCI Express or only the Resume PROM is relied on for identification, a case can arise in which a misidentification is made, especially as new I/O modules and variants of existing I/O modules are created.

With respect to variants, there are cases in which a module is functionally very similar to its predecessor, e.g., because a design was tweaked to fix a bug or to make an enhancement, and in which PCI Express will not distinguish the module from the predecessor, but in which it would be improper to treat the module in the same way as the predecessor. For example, the module may need to be programmed differently or otherwise treated differently due to the design tweak. In such cases, PCI Express does not provide adequate information, and the Resume PROM's information is helpful.

Thus, for determining the nature of modules, it is useful to have a system of checks and balances in which both PCI Express and the Resume PROM are used, at least in a difficult case. In such a case, using both allows validation of PCI Express via the Resume PROM, or vice versa, such that the module can be deemed faulty and possibly a determination can be made as to the severity of the fault and whether or not it is contained entirely within the module.

Effective identification of the module also improves the accuracy of applications of a rule referred to as the 100% rule, described in more detail below. In accordance with the 100% rule, if 100% of pertinent tests of an FRU (e.g., a module) are failed, another FRU at the other end of a path (e.g., a PCI Express link) is also determined to be faulty, i.e., both sides of the path are determined to be faulty.

Being able to determine accurately the identity of a module even when it is faulty is highly useful for effective application of the 100% rule. Once a module's identity is determined (through PCI Express or the Resume PROM or both), software objects are created on the fly during discovery that correspond to tests of the module, and the tests are executed. If all of the tests fail, creating a 100% failure, both sides of the path are determined to be faulty because it is insufficiently possible to narrow the fault to only one side.

In at least one implementation, the tests include an initial register test to determine whether a device's registers can be read and written to and produce expected results. If so, a more complicated test is executed in which the device is activated and is directed to access memory (e.g., a DMA test). Passing these tests is a good indication that the device is operable and running and that the path to the device is operable and running.

In the case of a test failure, it is desirable to try to determine whether the problem is on an I/O module that contains the device or back on the CPU module side or between the modules. Adopting the 100% rule establishes a policy that if none of the tests passed, e.g., if the register test failed and the more complicated test was not even executed or if executed, it failed, the conclusion is that it cannot be determined where the problem resides; it could reside on the CPU module, or on the I/O module side. On the other hand, if the register test passed, but the more complicated test failed, the burden is more on the I/O module side, because it was possible to communicate with the device in the first place.

For example, if a bridge on an I/O module is expected to provide access to four different devices on the module, if the register tests pass for the devices but a DMA test does not, it may be possible to isolate the problem to the I/O module. Passage of the register tests indicates that the devices are present and working to some degree. The DMA test (or, in another example, an interrupt test) is mastered from the I/O module side. In at least some cases, the 100% rule can be qualified such that, in this example, if all four devices fail the DMA test, both the CPU module and the I/O module are deemed to be faulty.

The reliance on not just PCI Express but also on the Resume PROM helps prevent the wrong kind or number of tests to be executed for the module, because more accurate identification of the module allows a more accurate determination as to the expected device content of the module.

Figure 5:
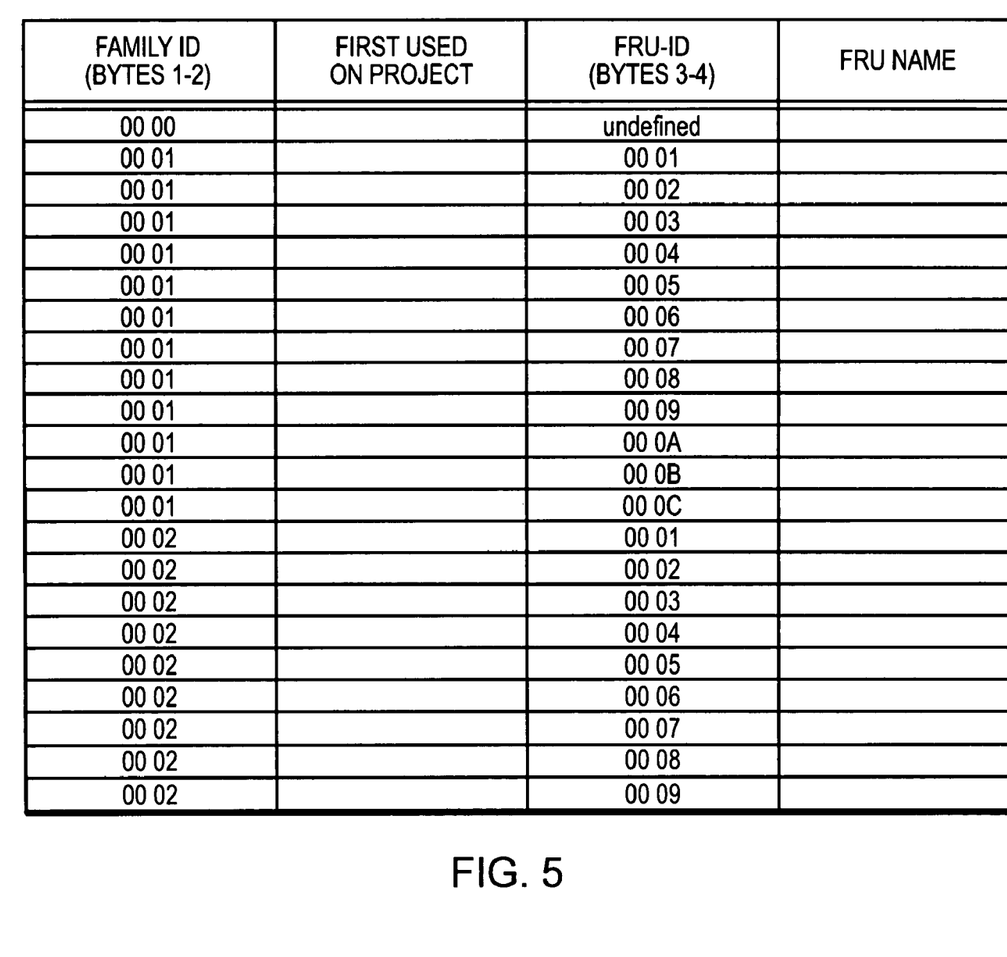
FIG. 5 is an illustration of a data structure that may be used with the systems of FIGS. 4, 6.

As shown by example in FIG. 5, the FFID includes a Family ID and a FRU-ID and indicates a module or module version within a family of storage processors. The family may include multiple different CPU modules and multiple different I/O modules, each potentially with minor design tweak differences. For example, depending on the I/O module type, the module may or may not have a PCI Express switch device.

POST is pre-supplied with information about the devices that are supposed to be present on each module type, and therefore can determine whether a module has a problem because it lacks a device. A new module design typically has a substantially different PCI Express profile such that it readily be identified by vendor ID and device ID. However, where a design tweak such as a CPLD is added to address a device errata that was never a part of the original design, the FFID can be used to allow tests to take into account the design tweak in treating the module.

In particular, POST can correlate the results of PCI Express enumeration with pre-supplied tables to determine whether the module has all of the devices expected.

In at least one implementation, a conventional Plug and Play BIOS approach is not used for enumeration because its results can shift in the event of failure and cause devices to have different bus numbers as a result of a failure. Instead, with respect to ports of the Northbridge, the Northbridge is read to determine a low bus number and a high bus number and all are scanned. If the results match a table's contents exactly, a module is determined to be found in PCI space. For example, it may be expected that a particular port maps to I/O module 0 and therefore the results of the scan are expected to match exactly one of the tables to correspond to a known module, and then the conclusion is validated with information from the Resume PROM.

When a new modules is created, POST may be updated so that the new module will be recognized.

Figure 6:
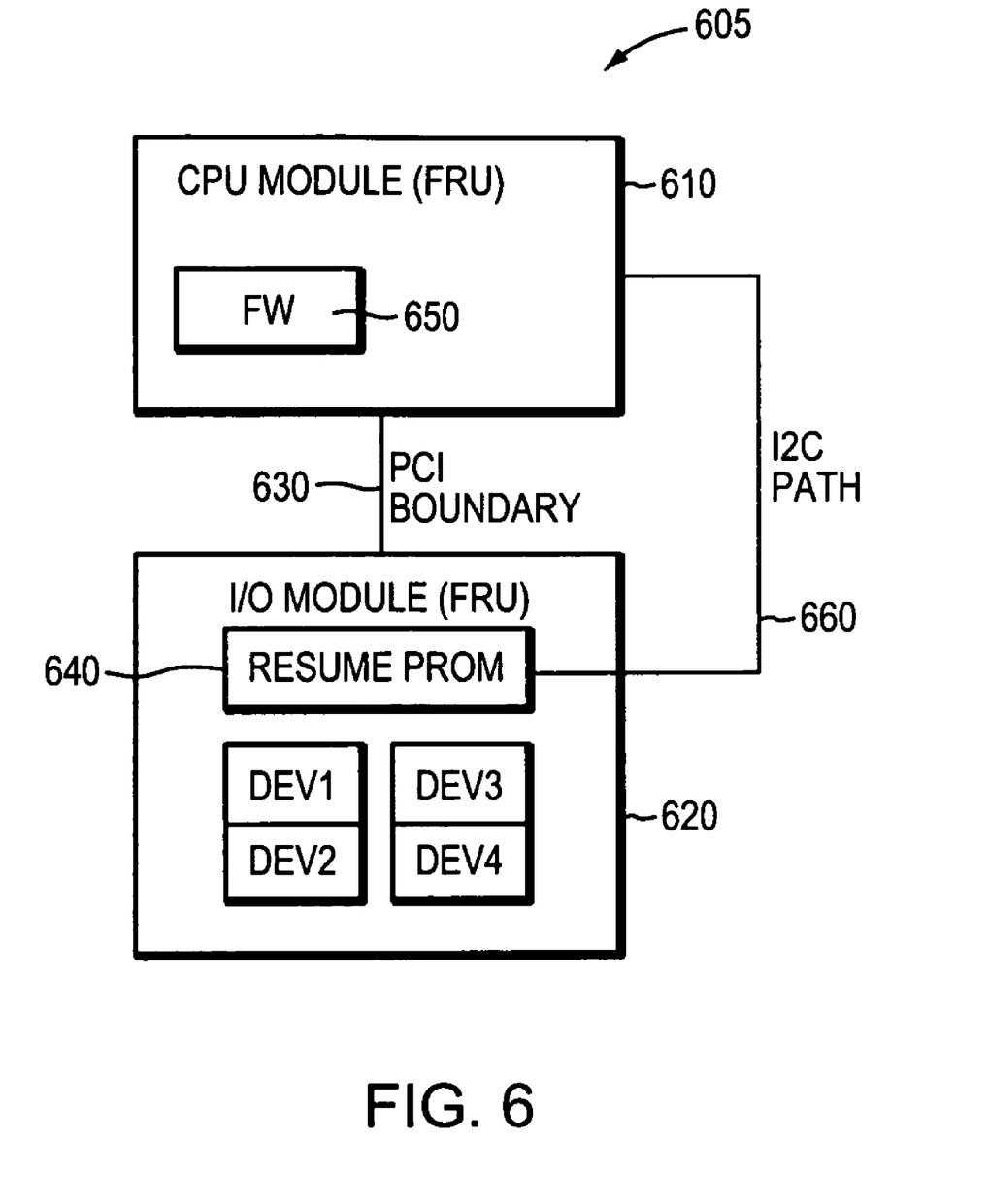

FIG. 6 illustrates an example configuration 605 in which a CPU module 610 communicates with an I/O module 620 over PCI Express link 630 which establishes a PCI boundary between the modules. The CPU module has firmware 650, and the I/O module has Resume PROM 640 which can be accessed by the CPU module, including the firmware, over an I2C path 660. The I/O module also has various devices Dev1, Dev2, Dev3, Dev4 which are referenced below. In such a case, the 100% rule applies to an FRU identification strategy in which firmware (e.g., POST) executing on the CPU module attempts to identify failing FRUs so that field service, in replacing FRUs after a fault occurs, can avoid replacing non-faulty FRUs.

Figure 7:
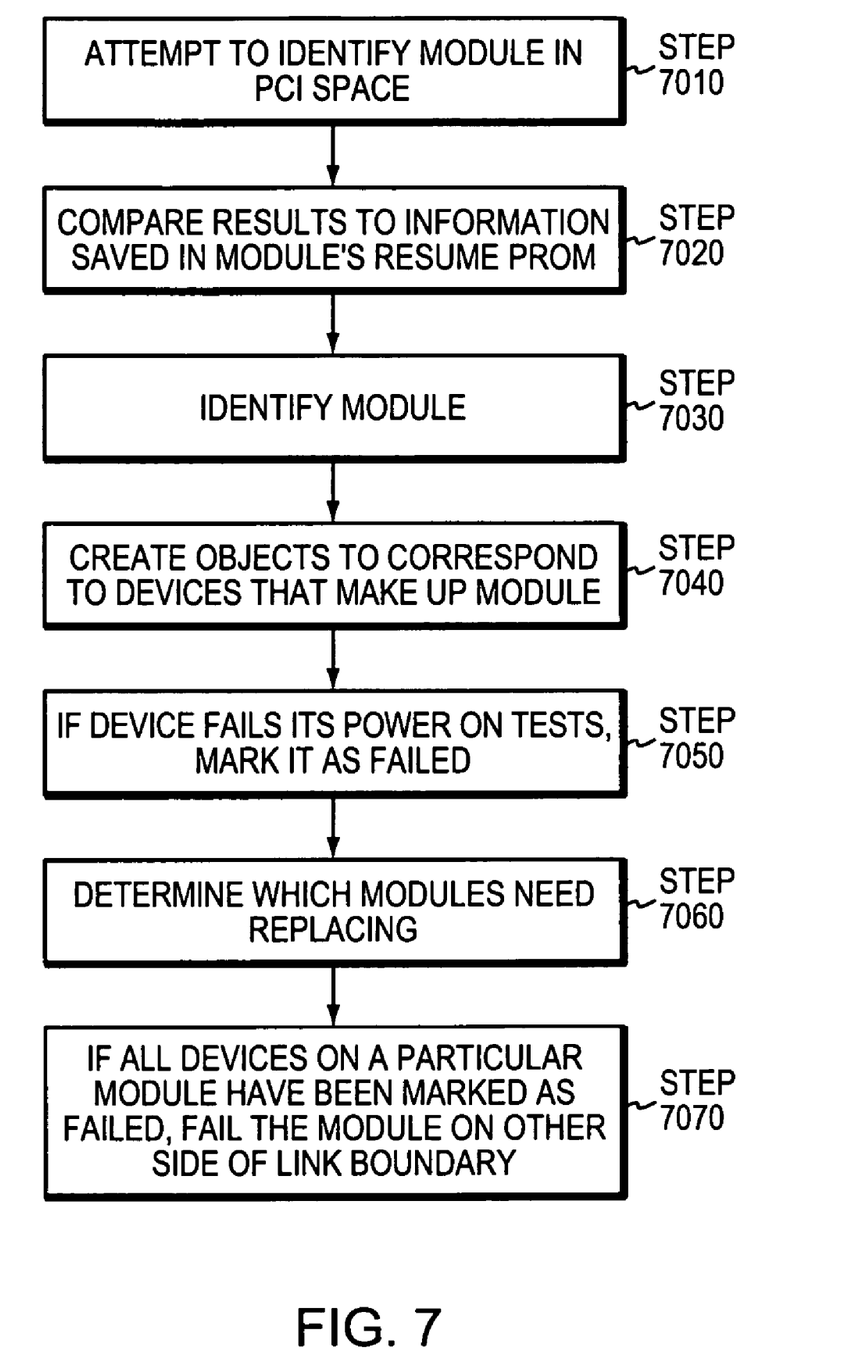
FIG. 7 is an flow diagram of a procedure that may be used with the systems of FIGS. 4, 6.

In particular as illustrated in FIG. 7, the firmware attempts to correctly determine the type of I/O module connected to the CPU module even when part or all of the I/O module is not working properly. The firmware first attempts to identify the I/O module as it appears in PCI space (step 7010). The PCI results are then compared to the information saved in the I/O module's Resume PROM which is accessible using I2C accesses (step 7020). Once the I/O module has been identified (step 7030), the firmware creates objects to correspond to the appropriate devices (Dev) that make up the I/O module (step 7040).

In the event that one of the devices fails its power on tests, it is marked as failed (step 7050), which result is used after all tests have run to determine which FRUs need replacing (step 7060). If all devices on a particular FRU have been marked as failed, the fault could lie on the boundary of two FRUs. In accordance with the 100% rule, since all devices failed on one FRU, the firmware also fails the FRU on the other side of the boundary (step 7070). Depending on the implementation, the firmware could be configured to allow for specialization and/or qualification to the 100% rule.

For example, if Dev1 failed on the I/O module but the remaining devices (Dev2, Dev3, Dev 4) passed their power on tests, only the I/O module FRU would be determined to have failed. If, however, all the devices (Dev1, Dev2, Dev3, Dev4) failed, the 100% rule would dictate that both the CPU module and the I/O module be failed.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, all or part of one or more of the techniques above may be used with other types of links or paths, such as Fibre Channel, Rapid IO, 1394 Firewire, USB, SAS, or SATA. All or part of one or more of the techniques above may be used with multiple Northbridges and/or multiple FC controllers and/or multiple PCI Express switches.

What is claimed is:

1. A method for use in managing system field replaceable units (FRUs), comprising:
    based on a first communication path to a FRU, determining first identification information for the type of the FRU;
    based on a second communication path to the FRU, determining second identification information for the type of the FRU;
    based on the first identification information and the second identification information, determining an identity for type of the FRU;
    based on the identity, performing a set of tests on the FRU; and
    based on the failure rate of the set of tests, concluding that another FRU on the first communication path is faulty.

2. The method of claim 1, wherein the first communication path includes a PCI Express link.

3. The method of claim 1, wherein the second communication path includes an I2C link.

4. The method of claim 1, further comprising:
    using the second communication path to retrieve the second identification information from a PROM device.

5. The method of claim 1, further comprising:
    using the first communication path and a Northbridge device to retrieve the first identification information.

6. The method of claim 1, further comprising:
    using the first communication path to determine the presence of devices on the FRU.

7. The method of claim 1, further comprising:
    using the second identification information to determine a set of devices expected to be found in the FRU.

8. The method of claim 1, further comprising:
    determining whether a Fibre Channel can be communicated with over the first communication path.

9. The method of claim 1, further comprising:
    using the first communication path to discover devices on the FRU; and
    deriving the first identification information from the results of the discovery.

10. The method of claim 1, further comprising:
    using the first communication path to discover devices on the FRU; and
    comparing the second identification information to the results of the discovery.

11. The method of claim 1, further comprising:
    performing PCI Express enumeration over the first communication path; and
    deriving the first identification information from the results of the enumeration.

12. The method of claim 1, further comprising:
    if the failure rate is 100%, determining that the other FRU is faulty.

13. The method of claim 1, further comprising:
    performing registers tests against devices on the FRU.

14. The method of claim 1, further comprising:
    performing memory tests against devices on the FRU.

15. A system for use in managing system FRUs, comprising:
    first logic determining, based on a first communication path to a FRU, first identification information for the type of the FRU;
    second logic determining, based on a second communication path to the FRU, second identification information for the type of the FRU;

third logic determining, based on the first identification information and the second identification information, an identity for the type of the FRU;

fourth logic performing, based on the identity, a set of tests on the FRU; and fifth logic concluding, based on the failure rate of the set of tests, that another FRU on the first communication path is faulty.

16. The system of claim 15, wherein the first communication path includes a PCI Express link.

17. The system of claim 15, wherein the second communication path includes an I2C link.

18. The system of claim 15, further comprising:

sixth logic using the second communication path to retrieve the second identification information from a PROM device.

19. The system of claim 15, further comprising:

sixth logic using the first communication path and a Northbridge device to retrieve the first identification information.

20. A system for use in managing system FRUs, comprising:

a data storage system having a storage processor in communication with disk drives;

first logic determining, based on a first communication path to a FRU on the storage processor, first identification information for the type of the FRU;

second logic determining, based on a second communication path to the FRU, second identification information for the type of the FRU;

third logic determining, based on the first identification information and the second identification information, an identity for the type of the FRU;

fourth logic performing, based on the identity, a set of tests on the FRU; and fifth logic concluding, based on the failure rate of the set of tests, that another FRU on the first communication path is faulty.

* * * * *